(12) United States Patent
Igarashi et al.

(10) Patent No.: US 9,584,481 B2
(45) Date of Patent: Feb. 28, 2017

(54) HOST PROVIDING SYSTEM AND COMMUNICATION CONTROL METHOD

(71) Applicant: NTT DOCOMO, INC., Chiyoda-ku (JP)

(72) Inventors: Ken Igarashi, Chiyoda-ku (JP); Mana Kaneko, Chiyoda-ku (JP); Makoto Sasaki, Chiyoda-ku (JP); Satoru Imai, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/383,375

(22) PCT Filed: Jan. 24, 2013

(86) PCT No.: PCT/JP2013/051429
§ 371 (c)(1),
(2) Date: Sep. 5, 2014

(87) PCT Pub. No.: WO2013/132909
PCT Pub. Date: Sep. 12, 2013

(65) Prior Publication Data
US 2015/0026780 A1  Jan. 22, 2015

(30) Foreign Application Priority Data
Mar. 7, 2012  (JP) ................. 2012-050696

(51) Int. Cl.
*H04L 29/06* (2006.01)
*H04L 12/721* (2013.01)
(Continued)

(52) U.S. Cl.
CPC ........ *H04L 63/0263* (2013.01); *H04L 45/308* (2013.01); *H04L 45/72* (2013.01);
(Continued)

(58) Field of Classification Search
CPC ............ H04L 63/0227; H04L 63/0236; H04L 63/0263; H04L 63/10; H04L 63/101;
(Continued)

(56) References Cited

U.S. PATENT DOCUMENTS 7,360,086 B1* 4/2008 Tsuchiya ................. H04L 12/44
370/389
7,443,860 B2* 10/2008 Johnsen ................ H04L 63/126
370/389

(Continued)

OTHER PUBLICATIONS

No stated author; Cisco—Catalyst 4500 Series Switch Cisco IOS Software Configuration Guide R 12.2(54)SG; 2010; Retrieved from the Internet <URL: cisco.com/c/en/us/td/docs/switches/lan/catalyst4500/12-2/54sg/configuration/guide/config.pdf>; pp. 1-201 as printed.*

(Continued)

*Primary Examiner* — Zachary A Davis
(74) *Attorney, Agent, or Firm* — Oblon, McClelland, Maier & Neustadt, L.L.P.

(57) ABSTRACT

A host providing system includes a physical host network switch which determines permission and non-permission of communication on the basis of whether or not information pieces indicating users correlated with information indicating a transmission source and information indicating a transmission destination included in communication data from a physical instance match each other, and controls the communication data on the basis of a determination result. Accordingly, since only communication between instances of the same user is permitted, and thus communication from a physical instance is appropriately controlled, it is possible to ensure security in the system.

11 Claims, 13 Drawing Sheets

(51) Int. Cl.
*H04L 12/725* (2013.01)
*H04L 12/931* (2013.01)

(52) U.S. Cl.
CPC .......... *H04L 63/0236* (2013.01); *H04L 63/10* (2013.01); *H04L 49/354* (2013.01)

(58) Field of Classification Search
CPC ....... H04L 45/72; H04L 45/74; H04L 49/354; H04L 49/35
See application file for complete search history.

(56) References Cited

U.S. PATENT DOCUMENTS

| | | | |
|---|---|---|---|
| 8,880,657 B1* | 11/2014 | Angrish et al. | 709/220 |
| 2005/0182966 A1 | 8/2005 | Pham et al. | |
| 2011/0283017 A1 | 11/2011 | Alkhatib et al. | |
| 2015/0327285 A1* | 11/2015 | Aida | H04L 47/20 370/392 |

OTHER PUBLICATIONS

Cisco. "Catalyst 4500 Series Switch Cisco IOS Software Configuration Guide, Release 12.2(54)SG". 2010. pp. i-xlvii.*
"The openQRM Datacenter Management and Cloud Computing Platform", URL: http://openstack.org/, pp. 1-68, (Feb. 17, 2012).
International Search Report Issued Mar. 19, 2013 in PCT/JP13/051429 Filed Jan. 24, 2013.
International Preliminary Report on Patentability issued Sep. 18, 2014 in PCT/JP2013/051429 filed Jan. 24, 2013 (English translation).
Written Opinion issued Mar. 19, 2013 in PCT/JP2013/051429 filed Jan. 24, 2013 (English translation).
Extended European Search Report issued Oct. 30, 2015 in Patent Application No. 13757511.4.

* cited by examiner

*Fig.4*

| INSTANCE ID | INTERFACE ID | DATA PATH ID | PORT ID | USER ID | IP ADDRESS | MAC ADDRESS | ... |
|---|---|---|---|---|---|---|---|
| 1001 | ITF$_{1001}$ | DP$_{1001}$ | Port$_{1001}$ | A | IP-A1 | MAC-A1 | |
| 1002 | ITF$_{1002}$ | DP$_{1002}$ | Port$_{1002}$ | A | IP-A2 | MAC-A2 | |
| 1003 | ITF$_{1003}$ | DP$_{1003}$ | Port$_{1003}$ | B | IP-B1 | MAC-B1 | |
| ... | ... | ... | ... | ... | ... | ... | ... |

*Fig.5*

| USER ID | VLANID |
|---------|--------|
| A | $VID_A$ |
| B | $VID_B$ |
| ⋮ | ⋮ |

Fig.6

| PORT ID | USER ID | AUTHENTICATION RULE | | PROCESS |
|---|---|---|---|---|
| | | PRIORITY | RULE | |
| Port1001 | A | 10040 | TRANSMISSION SOURCE L4 PORT NUMBER 67 AND TRANSMISSION DESTINATION L4 PORT NUMBER 68 | COMMUNICATION NON-PERMISSION |
| | | 10030 | TRANSMISSION SOURCE L4 PORT NUMBER 68 AND TRANSMISSION DESTINATION L4 PORT NUMBER 67 | COMMUNICATION PERMISSION |
| | | 10020 | TRANSMISSION SOURCE MAC: MAC-A1 AND TRANSMISSION SOURCE IP: IP-A1 | COMMUNICATION PERMISSION |
| | | 10010 | NO RULE | COMMUNICATION NON-PERMISSION |
| Port1002 | A | 10040 | TRANSMISSION SOURCE L4 PORT NUMBER 67 AND TRANSMISSION DESTINATION L4 PORT NUMBER 68 | COMMUNICATION NON-PERMISSION |
| | | 10030 | TRANSMISSION SOURCE L4 PORT NUMBER 68 AND TRANSMISSION DESTINATION L4 PORT NUMBER 67 | COMMUNICATION PERMISSION |
| | | 10020 | TRANSMISSION SOURCE MAC: MAC-A2 AND TRANSMISSION SOURCE IP: IP-A2 | COMMUNICATION PERMISSION |
| | | 10010 | NO RULE | COMMUNICATION NON-PERMISSION |
| Port1003 | B | 10040 | TRANSMISSION SOURCE L4 PORT NUMBER 67 AND TRANSMISSION DESTINATION L4 PORT NUMBER 68 | COMMUNICATION NON-PERMISSION |
| | | 10030 | TRANSMISSION SOURCE L4 PORT NUMBER 68 AND TRANSMISSION DESTINATION L4 PORT NUMBER 67 | COMMUNICATION PERMISSION |
| | | 10020 | TRANSMISSION SOURCE MAC: MAC-B1 AND TRANSMISSION SOURCE IP: IP-B1 | COMMUNICATION PERMISSION |
| | | 10010 | NO RULE | COMMUNICATION NON-PERMISSION |
| ... | ... | ... | ... | ... |

Fig.12

| STORAGE ID | IP ADDRESS | USER ID | INSTANCE TYPE OF ACCESS SOURCE |
|---|---|---|---|
| $I_{A1}$ | IP-A1 | A | PHYSICAL |
| $I_{A2}$ | IP-A2 | A | PHYSICAL |
| $I_B$ | IP-B1 | B | PHYSICAL |

HOST PROVIDING SYSTEM AND COMMUNICATION CONTROL METHOD

TECHNICAL FIELD

The present invention relates to a host providing system and a communication control method.

BACKGROUND

In recent years, a service has been conducted in which resources which are required to build and operate an information system are provided via the Internet. This service is called, for example, Infrastructure as a Service (Iaas). A technique is known in which a plurality of virtual instances are formed in a single physical server, and the virtual instances are provided to users as virtual host computers (for example, refer to Non-Patent Literature 1). In this technique, each physical server has a function of selecting, starting, and managing a virtual instance which has a performance complying with a request from a user. In addition, in this technique, each physical server has a control function of controlling data communication between virtual instances. This control function interrupts data communication between virtual instances provided to different users, or interrupts access to a storage which is allocated to a virtual instance provided to another user. In addition, the instance refers to a set of resources such as a CPU, a memory, and a storage.

CITATION LIST

Non Patent Literature

[Non-Patent Literature 1] "open stack", [online], [searched on Feb. 17, 2012], the Internet <openstack.org>.

SUMMARY OF INVENTION

Technical Problem

In the above-described technique, only a virtual instance can be addressed. The computational resources for creating a virtual instance may be referred to as the overhead for generating the virtual instance. Deterioration in performance occurs due to the overhead for generating a virtual instance depending on the kind of application used by a user. For this reason, there is a demand for providing a physical instance in order to operate an application in which performance deterioration occurs when a virtual instance is used, in a service such as Iaas. The physical instance is an instance which is formed alone in a single physical server. Since the physical instance is directly connected to a network for communication between instances, in a case where communication from a physical instance is not appropriately managed and controlled, a malicious user of a physical instance can access a physical instance of another user and a storage allocated to the physical instance via the corresponding physical instance and the network, and thus security is not ensured. Therefore, there is a demand for a technique for ensuring security by appropriately controlling communication between physical instances and access to a storage.

Therefore, the present invention has been made in consideration of the problem, and an object thereof is to provide a host providing system and a communication control method capable of ensuring security by appropriately controlling communication from a physical instance in a system providing a physical instance which is formed alone in a single physical server via a network.

Solution to Problem

In order to solve the above-described problem, according to an aspect of the present invention, there is provided a host providing system providing an instance constituted by predetermined hardware resources to a user terminal as a host computer via a first network so that the instance can be used, in compliance with a request from the user terminal. The host providing system includes a plurality of physical servers, which can communicate with each other via a second network and can provide a physical instance that is physically formed alone in a physical server as a physical host. The system includes communication data receiving means for receiving communication data having another instance as a transmission destination from a physical instance via the second network; determination means for determining permission and non-permission of communication on the basis of whether or not information pieces indicating users which are respectively correlated with information indicating a transmission source and information indicating a transmission destination included in the communication data received by the communication data receiving means match each other; and communication data control means for permitting communication with the transmission destination and sending the communication data to the transmission destination when communication permission is determined by the determination means, and for not permitting communication with the transmission destination and not sending the communication data to the transmission destination when communication permission is not determined.

In addition, in order to solve the above-described problem, according to an aspect of the present invention, there is provided a communication control method of controlling communication between instances in a host providing system providing the instance constituted by predetermined hardware resources to a user terminal as a host computer via a first network so that the instance can be used, in compliance with a request from the user terminal. The host providing system includes a plurality of physical servers, which can communicate with each other via a second network and can provide a physical instance that is physically formed alone in a physical server as a physical host. The method includes a communication data receiving step of receiving communication data having another instance as a transmission destination from a physical instance via the second network; a determination step of determining permission and non-permission of communication on the basis of whether or not information pieces indicating users which are respectively correlated with information indicating a transmission source and information indicating a transmission destination included in the communication data received in the communication data receiving step match each other; and a communication data control step of permitting communication with the transmission destination and sending the communication data to the transmission destination when communication permission is determined in the determination step, and of not permitting communication with the transmission destination and not sending the communication data to the transmission destination when communication permission is not determined.

According to the aspects, permission and non-permission of communication are determined on the basis of whether or not information pieces indicating users correlated with information indicating a transmission source and information indicating a transmission destination included in communication data from a physical instance match each other, and the communication data is controlled on the basis of a determination result. Accordingly, since only communication between instances of the same user is permitted, and thus communication from a physical instance is appropriately controlled, it is possible to ensure security in the system.

In the host providing system according to another aspect, the determination means may refer to a table which correlates information indicating a transmission source or a transmission destination with port identification information of a port receiving corresponding communication data and user identification information of a user; extract identification information of a port correlated with the information indicating the transmission source as first port identification information, and extract user identification information correlated with the first port identification information as first user identification information; extract identification information of a port correlated with information indicating the transmission destination as second port identification information, and extract user identification information correlated with the second port identification information as second user identification information; and determine permission and non-permission of communication on the basis of whether or not the first user identification information matches the second user identification information.

According to the aspect, it is appropriately determined whether or not received communication data is communication data between physical instances of the same user.

In the host providing system according to still another aspect, the determination means may determine permission and non-permission of communication of the communication data by further determining whether or not at least one of the information pieces indicating a transmission source and the information pieces indicating a transmission destination of the communication data falls under an authentication rule set in a port connected to the physical instance among predetermined authentication rules which are set in advance in each port receiving the communication data.

In the communication control method according to still another aspect, in the determination step, permission and non-permission of communication of the communication data may be determined by further determining whether or not at least one of the information pieces indicating a transmission source and a transmission destination of the communication data falls under an authentication rule set in a port connected to the physical instance among predetermined authentication rules which are set in advance in each port receiving the communication data.

According to the aspects, it is determined whether or not at least one of information indicating a transmission source and information indicating a transmission destination included in communication data from a physical instance is suitable for a predetermined authentication rule, and the communication data is controlled on the basis of a determination result. Since a condition required to permit communication can be set as an authentication rule, only communication data whose communication should be permitted is permitted to communicate and is sent to a transmission destination, and communication data whose communication should not be permitted is not sent to a transmission destination. Accordingly, communication from a physical instance is appropriately controlled, and thus it is possible to ensure security in the system.

The host providing system according to still another aspect may further include one or more virtual instance servers that can virtually form a plurality of virtual instances, can provide the virtual instance to a user terminal as a virtual host via the first network, and can communicate with other servers via the second network, and the communication data control means may append a virtual network identifier for identifying a virtual network which is virtually and uniquely allocated to a single user and is formed in the second network, to the communication data.

According to the aspect, in a case where the system includes a server in which a plurality of virtual instances are formed, a virtual network identifier for identifying a virtual network which is virtually formed for a single user is appended to communication data from a physical instance, and thus it is possible to appropriately control communication from a physical instance to a virtual instance in the system.

The host providing system according to still another aspect may further include a storage group that includes a plurality of storages which are respectively correlated with respective instances and can be accessed via the second network; access receiving means for receiving an access request which corresponds to access to a storage from the instance and includes an IP address for identifying the instance and a storage identifier for identifying the storage which is an access target; storage attribute storage means for storing an IP address of an instance to which the storage is allocated in correlation with the storage identifier; access determination means for determining whether or not an IP address included in access received by the access receiving means corresponds to an IP address correlated with a storage identifier of a storage which is a target of the access in the storage attribute storage means; and access control means for permitting the access to the storage and sending the access request to the storage when it is determined by the access determination means that the IP address included in the access corresponds to the IP address correlated with the storage identifier, and for not permitting the access to the storage and not sending the access request to the storage when it is determined that the IP address included in the access request does not correspond to the IP address correlated with the storage identifier.

In the communication control method according to still another aspect, the host providing system may further include a storage group that includes a plurality of storages which are respectively correlated with respective instances and can be accessed via the second network; and storage attribute storage means for storing an IP address of an instance to which the storage is allocated in correlation with a storage identifier for identifying the storage, and the communication control method may further include an access receiving step of receiving an access request which correspond to access to a storage from the instance and includes an IP address for identifying the instance and a storage identifier for identifying the storage which is an access target; an access determination step of determining whether or not an IP address included in the access request received in the access receiving step corresponds to an IP address correlated with a storage identifier of a storage which is a target of the access in the storage attribute storage means; and an access control step of permitting the access to the storage and sending the access request to the storage when it is determined in the access determination step that the IP address included in the access request corresponds to the IP address correlated with the storage identifier, and of not permitting the access to the storage and not sending the access request to the storage when it is determined that the IP address included in the access request does not correspond to the IP address correlated with the storage identifier.

According to the aspect, access is permitted only in a case where an IP address included in an access request to a storage from a physical instance corresponds to an IP address of the physical instance to which the storage is allocated, and access is not permitted in other cases. Accordingly, access from instances other than the physical instance to which the storage is allocated is prevented, and thus security is appropriately ensured in the storage.

In the host providing system according to still another aspect, among the authentication rules, a first authentication rule may be that a port number of a transmission source included in communication data received by the communication data receiving means is a number indicating a server on a Dynamic Host Configuration Protocol (DHCP), and a port number of a transmission destination included therein is a number indicating a client on the DHCP, and the determination means may determine communication non-permission for the communication data when the communication data falls under the first authentication rule.

According to the aspect, a physical host which is a transmission source of communication data is appropriately prevented from pretending to be a DHCP server.

In the host providing system according to still another aspect, among the authentication rules, a second authentication rule may be that a port number of a transmission source included in communication data received by the communication data receiving means is a number indicating a client on a DHCP protocol, and a port number of a transmission destination included therein is a number indicating a server on the DHCP protocol, and the determination means may determine communication permission for the communication data when the communication data falls under the second authentication rule.

According to the aspect, a physical instance which is a transmission source of communication data is permitted to request a DHCP server to deliver an IP address.

In the host providing system according to still another aspect, among the authentication rules, a third authentication rule may be that a MAC address and an IP address of a transmission source included in communication data received by the communication data receiving means respectively correspond to a MAC address and an IP address of a physical instance connected to a port receiving the communication data, and the determination means may determine communication permission for the communication data when the communication data falls under the third authentication rule.

In this aspect, in communication from a physical instance connected to a port receiving communication data to another instance, validity of the physical instance which is a transmission source is appropriately determined. Therefore, for example, communication using a spoofed transmission source IP address is prevented.

Advantageous Effects of Invention

According to the aspects of the present invention, it is possible to ensure security by appropriately controlling communication from a physical instance in a system providing a physical instance which is formed alone in a single physical server via a network.

BRIEF DESCRIPTION OF DRAWINGS

FIG. 4 is a diagram schematically illustrating a physical instance information table which is used to generate an authentication rule.

FIG. 5 is a diagram schematically illustrating a virtual local area network (VLAN) information table.

FIG. 6 is a diagram schematically illustrating a configuration of an authentication rule storage unit and an example of stored data.

FIG. 12 is a diagram illustrating a configuration of a storage attribute storage section and an example of stored data.

DETAILED DESCRIPTION

Figure 1:
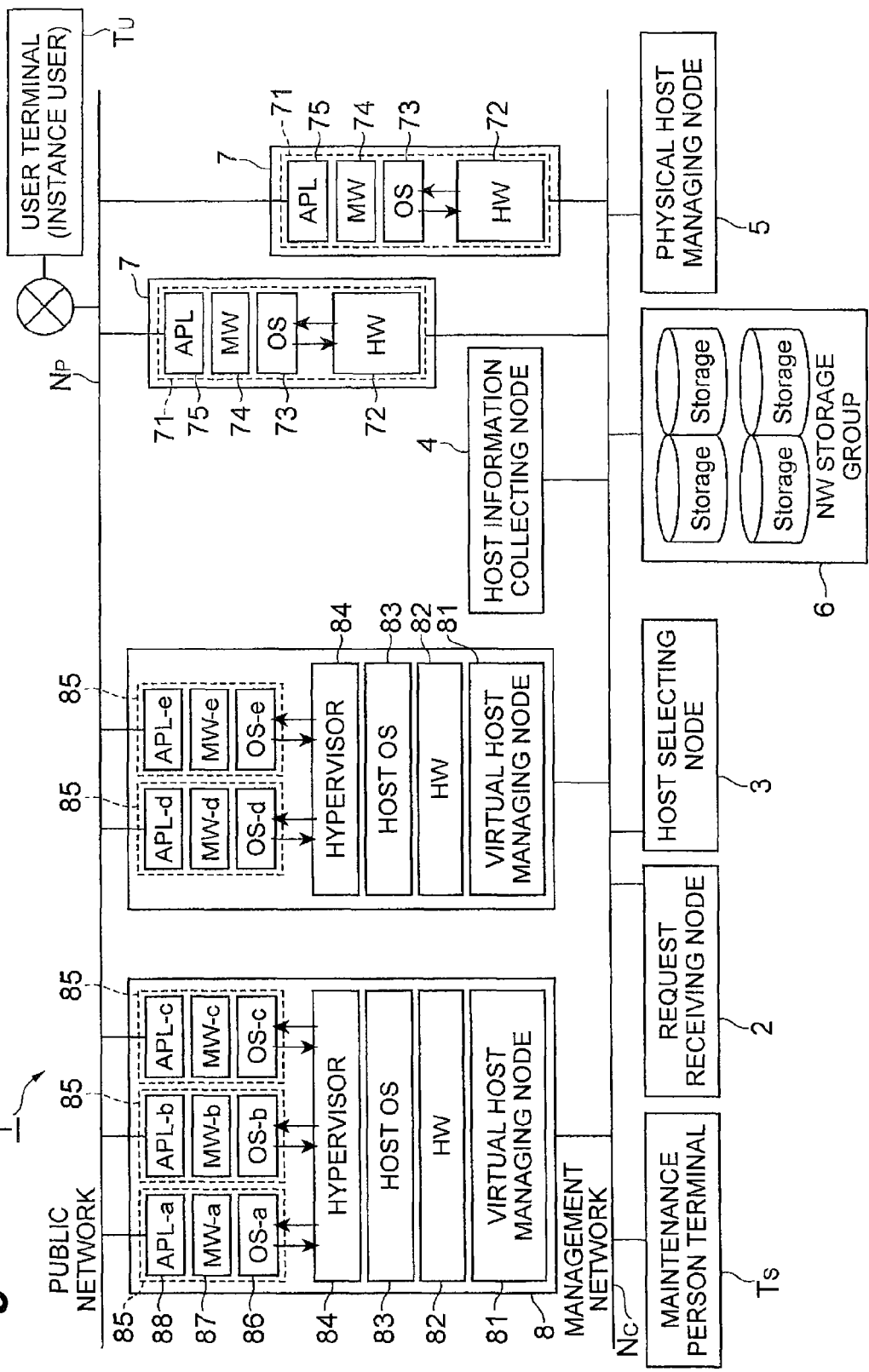
FIG. 1 is a block diagram illustrating an entire configuration of a host providing system.

Embodiments of a host providing system and a communication control method according to the present invention will be described with reference to the drawings. In addition, if possible, the same reference numerals are given to the same parts, and repeated description will be omitted.

FIG. 1 is a block diagram illustrating an entire configuration of a host providing system 1. The host providing system 1 is a system which provides an instance constituted by predetermined hardware resources to a user terminal $T_U$ as a host computer via a public network $N_P$ (first network) so that the instance can be used, in compliance with a request from the user terminal T. In addition, the host providing system 1 may include a plurality of first servers (physical servers) which can communicate with each other via a management network $N_C$ (second network), and may provide a physical instance which is physically formed alone in the first server to the user terminal $T_U$ as a physical host.

The host providing system 1 includes a request receiving node 2, a host selecting node 3, a host information collecting node 4, a physical host managing node 5, a network (NW) storage group 6, a first server 7, and a second server 8 (virtual instance server). The nodes and servers can communicate with each other via a management network $N_C$.

A maintenance person terminal $T_S$ is connected to the management network $N_C$ so as to communicate therewith, and a maintenance person of the system accesses the various nodes and servers via the maintenance person terminal $T_S$ so as to perform maintenance and management of the system.

In addition, the first server 7 and the second server 8 are connected to a public network $N_P$ so as to communicate therewith. The user terminal $T_U$ is connected to the public network $N_P$ so as to communicate therewith, and a user using an instance can access an instance formed in the first server 7 and the second server 8 via the user terminal $T_U$. Therefore, the user terminal $T_U$ can use the instance as a host computer.

The first server 7, the second server 8, and the NW storage group 6 will be described prior to description of the various nodes. The first server 7 is a physical server which forms a physical instance 71 alone in the first server 7. A single first server 7 can provide a single physical instance 71 to the user terminal $T_U$ as a physical host. The physical instance 71 includes hardware 72, an OS 73, middleware 74, and an application 75.

The second server 8 is a physical server which virtually forms a plurality of virtual instances 85 in the second server 8, and can provide the plurality of virtual instances 85 to the user terminal $T_U$ as virtual hosts. The virtual instance 85 includes an OS 86, middleware 87, and an application 88. The second server 8 further includes a virtual host managing node 81, hardware 82, a host OS 83, and a hypervisor 84.

The virtual host managing node 81 is a node which manages a plurality of virtual hosts, and stores virtual host information including information indicating a usage state of a virtual host in the host information collecting node 4. In addition, when an instance starting request is acquired from the host selecting node 3, the virtual host managing node 81 causes the hypervisor 84 to start any one of the plurality of virtual instances 85 as a virtual host. The hypervisor 84 is a functional unit which performs selection, management, starting, and the like of the virtual instance 85 which is provided as a virtual host. In addition, the hypervisor 84 interrupts data communication between virtual instances 85 which are provided to different users, or interrupts access to a storage allocated to a virtual instance which is provided to another user.

The NW storage group 6 is a set of storage devices which are provided to the user terminal $T_U$ along with a host, and is accessed by the physical instance 71 and the virtual instance 85 in order to read and write data.

In addition, in FIG. 1, each of the various nodes 2 to 5 is distributed to the management network $N_C$ and is thus configured as a standalone device, but a plurality of nodes may be configured in a single device altogether. Further, FIG. 1 illustrates an aspect in which the two first servers 7 are managed by the single physical host managing node 5, but the number of first servers 7 and the number of physical host managing nodes 5 managing the servers are not limited to the number illustrated in FIG. 1 and are arbitrary.

The request receiving node 2 is a node which receives an instance starting request from the user terminal $T_U$ and sends the received instance starting request to the host selecting node 3. The instance starting request includes instance type information indicating whether an instance related to the starting request is a virtual instance or a physical instance, and necessary performance information indicating performance of hardware which is necessary in an instance, such as the number of CPUs, a memory capacity, and a disk capacity.

The host selecting node 3 selects instances 71 and 85 which are provided as hosts and selects host managing nodes 5 and 81 which manage the selected instances on the basis of the instance type information and the necessary performance information included in the instance starting request acquired from the request receiving node 2. In addition, the host selecting node 3 sends starting requests for starting the selected instances 71 and 85 as host computers to the host managing nodes 5 and 81.

The host information collecting node 4 receives host information regarding a host state, and stores the received host information in predetermined storage means. The host information includes physical host information from the physical host managing node 5 and virtual host information from the virtual host managing node 81, and may include usage state information indicating a usage state of a host, the type of instance, information indicating whether or not each host is currently used, and information regarding a specification indicating a performance of a host.

The physical host managing node 5 notifies the host information collecting node 4 of host information indicating a state of a physical host (physical instance 71) under the control thereof. In addition, the physical host managing node 5 starts a physical host (physical instance 71) selected by the host selecting node 3, on the basis of the instance starting request sent from the host selecting node 3.

Figure 2:
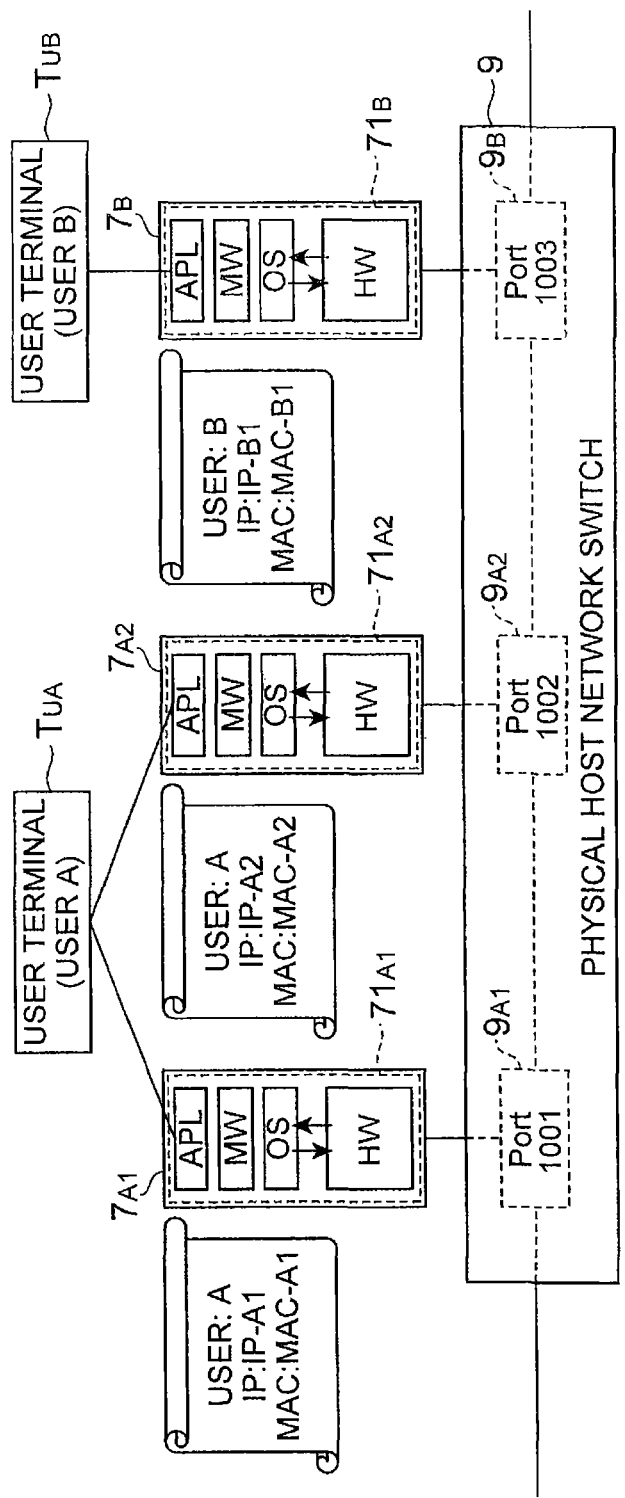
FIG. 2 is a diagram schematically illustrating a plurality of first servers 7 which are connected to each other via a management network.

Next, with reference to FIG. 2, functional units for controlling communication from a physical instance will be described. FIG. 2 is a diagram schematically illustrating a plurality of first servers 7 which are connected to each other via the management network $N_C$. As illustrated in FIG. 2, the management network $N_C$ includes a physical host network switch 9 (second network). In an example illustrated in FIG. 2, three first servers $7_{A1}$, $7_{A2}$ and $7_B$ are connected to the management network $N_C$ via the physical host network switch 9.

The first server $7_{A1}$ provides a physical instance $71_{A1}$ to a user terminal $T_{UA}$ of a user A as a physical host, and is connected to a port #Port1001 of the physical host network switch 9. The physical instance $71_{A1}$ has an IP address "IP-A1" and a MAC address "MAC-A1".

The first server $7_{A2}$ provides a physical instance $71_{A2}$ to the user terminal $T_{UA}$ of the user A as a physical host, and is connected to a port #Port1002 of the physical host network switch 9. The physical instance $71_{A2}$ has an IP address "IP-A2" and a MAC address "MAC-A2".

The first server $7_B$ provides a physical instance $71_B$ to a user terminal $T_{UB}$ of a user B as a physical host, and is connected to a port #Port1003 of the physical host network switch 9. The physical instance $71_B$ has an IP address "IP-B1" and a MAC address "MAC-B1".

In addition, in FIG. 2, the physical host network switch 9 is illustrated as a single device, but may be constituted by three network switches which are provided for respective ports as indicated by the dashed lines in FIG. 2.

Figure 3:
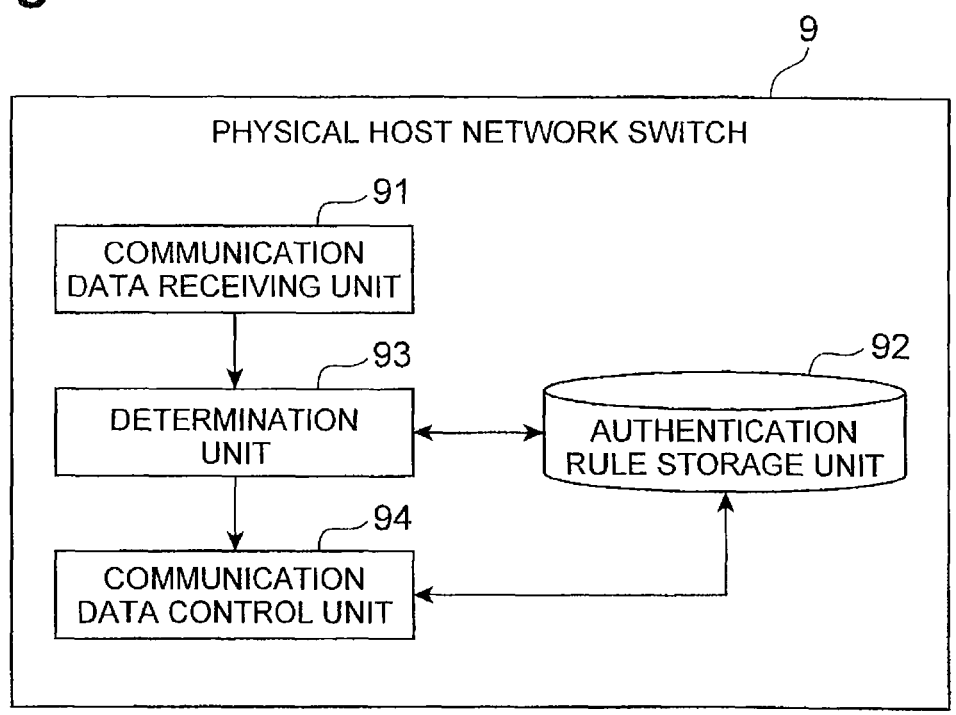
FIG. 3 is a block diagram illustrating a functional configuration of a physical host network switch.

FIG. 3 is a diagram illustrating a functional configuration of the physical host network switch 9. As illustrated in FIG. 3, the physical host network switch 9 includes a communication data receiving unit 91 (communication data receiving means), an authentication rule storage unit 92, a determination unit 93 (determination means), and a communication data control unit 94 (communication data control means).

The communication data receiving unit 91 is a part which receives communication data which has another instance as a transmission destination, from a single physical instance 71 via the management network $N_C$. The communication data includes at least one of a MAC address and an IP address indicating a transmission source of the communication data, and an IP address indicating a transmission destination thereof. The communication data receiving unit 91 sends the received communication data to the determination unit 93.

The authentication rule storage unit 92 is a part which stores an authentication rule regarding communication data which should be permitted to be communicated. FIG. 4 is a diagram schematically illustrating a physical instance information table used to generate an authentication rule. The physical instance information table stores various information pieces regarding a physical instance, and may be provided in the physical host managing node 5 illustrated in FIG. 1, for example. In addition, the physical instance information table may be provided in any one of other nodes 2, 3 and 4, or may be provided in other nodes (not illustrated). Further, the physical instance information table is also directly referred to in a determination process in the determination unit 93.

As illustrated in FIG. 4, the physical instance information table stores an interface ID, a data path ID, a port ID (port identification information), a user ID of a user terminal $T_U$ to which a corresponding physical instance is provided, an IP address, and a MAC address, in correlation with an instance ID for identifying the physical instance 71. The interface ID is an ID unique to a physical instance. The data path ID is an ID of a switch connected to a physical server in which a corresponding physical instance is formed. The port ID is a port ID of the switch. Each record of the physical instance information table may be set, for example, when a corresponding physical instance 71 is started by the physical host managing node 5 in order to be provided to the user terminal $T_U$ as a physical host. The data stored in the physical instance information table may be used to set an authentication rule in the authentication rule storage unit 92.

Figure 5:
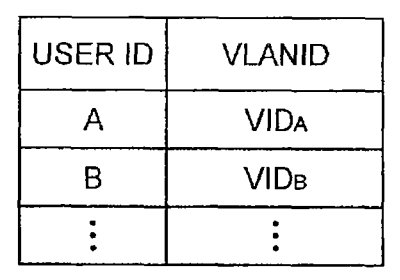

FIG. 5 is a diagram illustrating a virtual local area network (VLAN) information table stored in the physical host managing node 5 along with the physical instance information table or in any other node. The VLAN information table stores a VLAN ID (virtual network identifier) in correlation with a user ID.

The VLAN ID is an identifier for identifying a virtual network in order to virtually form networks which are logically divided for each user in the management network $N_C$ which is a single physical network. The VLAN ID assigned to each user is appended to communication data, and thus the communication data behaves so as to communicate in a virtual network which is uniquely formed for a corresponding user.

FIG. 6 is a diagram schematically illustrating a configuration of the authentication rule storage unit 92 and an example of stored data. As illustrated in FIG. 6, the authentication rule storage unit 92 stores, for each port ID of a port receiving communication data, a user of a user terminal $T_U$ to which a physical instance 71 connected to the port is provided, an authentication rule, and process content when the communication data falls under the authentication rule in correlation with each other.

The authentication rule is stored with a reference priority. The determination unit 93 described later determines permission and non-permission of communication of communication data by sequentially referring to authentication rules set in a higher rank. In addition, a specific determination process based on the authentication rule will be described later.

In a system of the related art in which the second server 8 (virtual instance server) treats only a plurality of virtual instances, the hypervisor 84 manages data communication between the virtual instances 85 by appending a VLAN ID which is allocated to each user during data transmission to communication data. In the present embodiment, a VLAN ID is appended to communication data from the physical instance 71, and thus data communication can be performed between the physical instance 71 and the virtual instance 85. In addition, as mentioned above, a method of forming a plurality of logically divided virtual networks in a single physical network is called a tagged VLAN method.

The determination unit 93 is a part which determines permission and non-permission of communication on the basis of whether or not information pieces indicating users correlated with information indicating a transmission source and information indicating a transmission destination included in communication data received by the communication data receiving unit 91 match each other. Specifically, the determination unit 93 refers to a physical instance information table in which a port ID and a user ID of a port receiving corresponding communication data are correlated with information (an IP address and a MAC address) indicating a transmission source or a transmission destination; extracts a port ID correlated with the information indicating the transmission source as a first port ID; extracts a user ID correlated with the first port ID as a first user ID; extracts a port ID correlated with the information indicating the transmission destination as a second port ID; extracts a user ID correlated with the second port ID as a second user ID; and determines permission and non-permission of communication on the basis of whether or not the first user ID matches the second user ID. In addition, user authentication between port IDs is assumed to also be performed between virtual and physical instances in the same manner.

In addition, the determination unit 93 further determines whether or not at least one of information pieces indicating a transmission source and a transmission destination of communication data falls under an authentication rule set in a port connected to a single physical instance among predetermined authentication rules which are set in advance in each port receiving the communication data when the data is transmitted from the physical instance connected to the port, so as to determine permission and non-permission of communication of the communication data. As a determination method, information and the like indicating a transmission source and a transmission destination of communication data are inquired in a descending order from the priority "10040" of the authentication rule. In a case where the information matches the rule, a process for the rule is performed. In a case where the information does not match the rule, an inquiry is made in relation to an authentication rule with the next priority.

The communication data control unit 94 is a part which permits communication with a transmission destination of corresponding communication data and sends the communication data to a communication destination in a case where communication permission is determined for the communication data by the determination unit 93. For example, in a case where communication permission is determined for communication data from the physical instance $71_{A1}$ to the physical instance $71_{A2}$ in the port $9_{A1}$, communication data received by the port $9_{A1}$ is sent to the physical instance $71_{A2}$ via the port $9_{A2}$. On the other hand, in a case where communication permission is not determined for the communication data by the determination unit 93, the communication data control unit 94 does not permit communication with the transmission destination and performs control so that the communication data is not sent to the transmission destination.

Next, with reference to FIGS. 2, 4 and 6, a detailed description will be made of examples of processes in the determination unit 93 and the communication data control unit 94.

First, a first example will be described. In the first example, communication is performed from the physical instance $71_{A1}$ to the physical instance $71_{A2}$. First, when communication data from the physical instance $71_{A1}$ is received by the communication data receiving unit 91, the determination unit 93 of the port $9_{A1}$ (the port ID: #Port1001) extracts the MAC address "MAC-A1" and the IP address "IP-A1" of the transmission source, and the MAC address "MAC-A2" and the IP address "IP-A2" of the transmission destination, from the communication data. Next, the determination unit 93 refers to the physical instance information table, extracts the port ID "$Port_{1001}$" correlated with the address of the transmission source, extracts the user ID "A" correlated with the port ID, extracts the port ID "$Port_{1002}$" correlated with the address of the transmission destination, and extracts the user ID "A" correlated with the port ID. In addition, since both of the extracted user IDs match each other, the determination unit 93 determines communication permission for the communication data.

Next, the determination unit 93 refers to the authentication rule set in correlation with the port ID: #Port1001 in the authentication rule storage unit 92 in a descending order from the priority "10040". In addition, since the MAC address and the IP address extracted from the communication data match "transmission source MAC address: MAC-A1 and transmission source IP address: IP-A1" of the referenced authentication rule "10020", the determination unit 93 determines that communication related to the communication data falls under the authentication rule. Further, the communication data control unit 94 permits communication of the communication data with the physical instance $71_{A2}$, and sends the communication data to the port $9_{A2}$ (the port ID: #Port1002).

Next, when the communication data receiving unit 91 of the port $9_{A2}$ (the port ID: #Port1002) receives the communication data, the determination unit 93 extracts the MAC address "MAC-A1" and the IP address "IP-A1" of the transmission source, and the MAC address "MAC-A2" and the IP address "IP-A2" of the transmission destination, from the communication data, and extracts the port ID "$Port_{1001}$" correlated with the address of the transmission source, the user ID "A" correlated with the port ID, the port ID "$Port_{1002}$" correlated with the address of the transmission destination, and the user ID "A" correlated with the port ID, in the physical instance information table. In addition, since both of the extracted user IDs match each other, the determination unit 93 determines that communication to the physical instance $71_{A2}$ is permitted for the communication data.

In this determination, data communication is permitted only when users of the physical instances 71 which are a transmission source and a transmission destination match each other, and validity of a transmission source is appropriately determined through determination on an address of the transmission source. Therefore, for example, communication using a spoofed transmission source IP address is prevented.

Next, a second example will be described. In the second example, communication to the physical instance $71_{A1}$ from the physical instance $71_B$ is tried. First, when communication data from the physical instance $71_B$ is received by the communication data receiving unit 91, the determination unit 93 of the port $9_B$ (the port ID: #Port1003) extracts the MAC address "MAC-B1" and the IP address "IP-B1" of the transmission source, and the MAC address "MAC-A1" and the IP address "IP-A1" of the transmission destination, from the communication data. Next, the determination unit 93 refers to the physical instance information table, extracts the port ID "$Port_{1003}$" correlated with the address of the transmission source, extracts the user ID "B" correlated with the port ID, extracts the port ID "$Port_{1001}$" correlated with the address of the transmission destination, and extracts the user ID "A" correlated with the port ID. In addition, since both of the extracted user IDs are different from each other, the determination unit 93 does not determine communication permission for the communication data. Further, the communication data control unit 94 does not permit communication of the communication data with the physical instance $71_{A1}$, and does not send the communication data to the port $9_{A1}$ (the port ID: #Port1001). In this determination, in communication to another instance from a physical instance 71 connected to a port which receives communication data, only communication to other instances provided to a user to which a physical instance is provided is permitted. Therefore, communication with instances allocated to users other than the user to which the corresponding physical instance is provided is prevented.

Next, a third example will be described. In the third example, communication to the physical instance $71_{A1}$ from the physical instance $71_B$ is tried. In addition, in this communication, it is assumed that the user B spoofs the IP address and the MAC address of the physical instance $71_{A2}$ of the user A. In this case, first, when communication data from the physical instance $71_B$ is received by the communication data receiving unit 91, the determination unit 93 of the port $9_B$ (the port ID: #Port1003) extracts the spoofed MAC address "MAC-A2" and IP address "IP-A2" of the transmission source, and the MAC address "MAC-A1" and the IP address "IP-A1" of the transmission destination, from the communication data. Next, the determination unit 93 refers to the physical instance information table, extracts the port ID "$Port_{1002}$" correlated with the address of the transmission source, extracts the user ID "A" correlated with the port ID, extracts the port ID "$Port_{1001}$" correlated with the address of the transmission destination, and extracts the user ID "A" correlated with the port ID. In addition, since both of the extracted user IDs match each other, the determination unit 93 determines communication permission for the communication data.

Next, the determination unit 93 refers to the authentication rule set in con-elation with the port ID: #Port1003 in the authentication rule storage unit 92 in a descending order from the priority "10040". In addition, since the communication data does not fall under the rules of the priority "10040" and "10030", and the MAC address and the IP address extracted from the communication data do not correspond to the authentication rule "transmission source MAC address: MAC-B1 and transmission source IP address: IP-B1" of the priority "10020" either, communication non-permission of the priority "10010" which is the lowest priority is applied, and thus the determination unit 93 does not determine permission of communication of the communication data. Further, the communication data control unit 94 does not permit communication of the communication data with the physical instance $71_{A1}$, and does not send the communication data to the port $9_{A1}$ (the port ID: #Port1001). In this determination, communication using spoofing of a MAC address and an IP address is appropriately prevented.

Next, a fourth example will be described. In the fourth example, the physical instance $71_{A1}$ requests a Dynamic Host Configuration Protocol (DHCP) server to deliver an IP address. In this case, first, when communication data from the physical instance $71_{A1}$ is received by the communication data receiving unit 91, in the same manner as in the first example, the determination unit 93 determines communication permission for the communication data.

Next, the determination unit 93 refers to the authentication rule set in correlation with the port ID: #Port1001 in the authentication rule storage unit 92 in a descending order from the priority "10040". In addition, since the communication data does not fall under the rule of the priority "10040", and falls under the authentication rule "transmission source L4 port number 68, and transmission destination L4 port number 67" of the priority "10030", the determination unit 93 determines communication permission for the communication data. Further, "68" of the transmission source L4 port number is a client in a DHCP protocol, and "67" of the transmission source L4 port number is a server in the DHCP protocol. Accordingly, the physical instance 71$_{A1}$ can make a request for delivery of an IP address.

Here, in a case where a physical instance which is a transmission source pretends to be a DHCP server, and thus communication data of "transmission source L4 port number 67, and transmission destination L4 port number 68" is sent, this corresponds to the authentication rule of the priority "10040", and thus the determination unit 93 does not permit communication of the communication data.

In addition, the communication data control unit 94 appends a VLAN ID (virtual network identifier) for identifying a virtual network which is virtually and uniquely allocated to a single user and is formed in the management network $N_C$, to the communication data. For example, in a case where the communication data is sent from the physical instance 71$_{A1}$ to the virtual instance 85 formed in the second server 8 via the port 9$_{A1}$, the communication data control unit 94 of the port 9$_{A1}$ gives "VID$_A$" of the VLAN ID correlated with the user ID "A" in the VLAN information table (refer to FIG. 5) to the communication data. Accordingly, as described above, data communication can be performed between the physical instance 71 and the virtual instance. In addition, in communication to the physical instance 71 from the virtual instance 85, the determination unit 93 may employ a rule that a VLAN ID allocated to a user of a corresponding physical instance is included in communication data, as an authentication rule.

Figure 7:
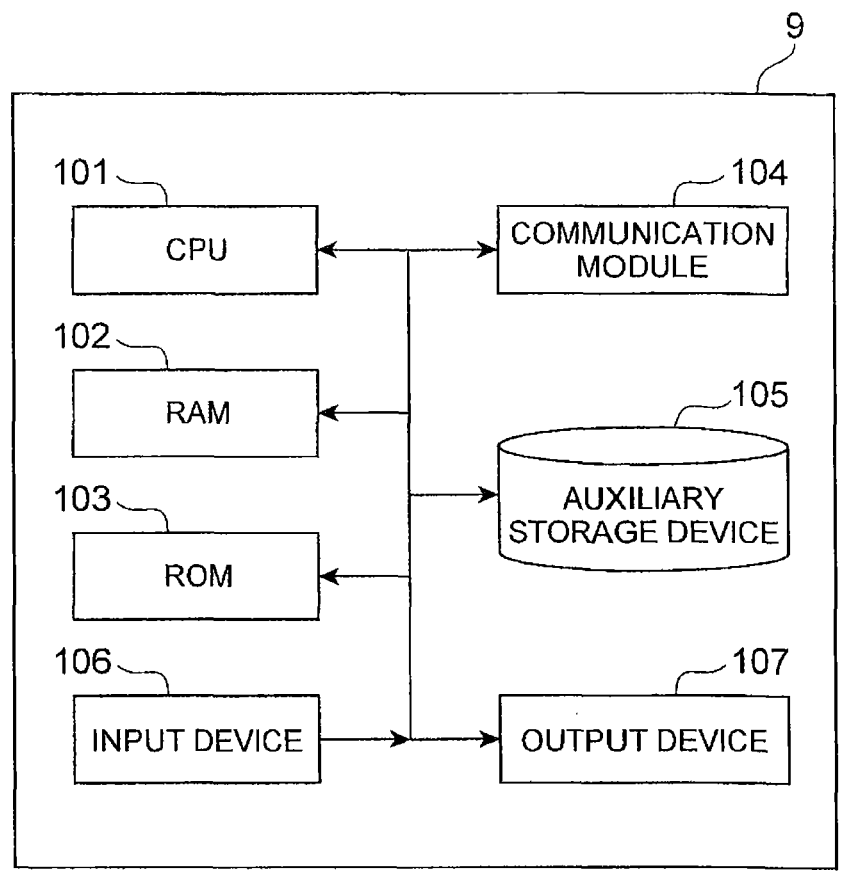
FIG. 7 is a hardware configuration diagram of the physical host network switch.

The physical host network switch 9 illustrated in FIG. 2 may be constituted by, for example, one or a plurality of computers. FIG. 7 is a hardware configuration diagram of the physical host network switch 9. A computer forming the physical host network switch 9 is physically configured as a computer system which includes, as illustrated in FIG. 7, a CPU 101, a RAM 102 and a ROM 103 which are main storage devices, a communication module 104 which is a data transmission and reception device, an auxiliary storage device 105 such as a hard disk or a flash memory, an input device 106 such as a keyboard which is an input device, an output device 107 such as a display, and the like. Predetermined computer software is read on hardware such as the CPU 101 and the RAM 102 illustrated in FIG. 7 so that the communication module 104, the input device 106, and the output device 107 are operated under the control of the CPU 101, and data reading and writing in the RAM 102 or the auxiliary storage device 105 are performed, thereby realizing the respective functions illustrated in FIG. 3. In addition, a storage access managing unit 60 described later with reference to FIGS. 8 and 9 has the same hardware configuration as the physical host network switch 9.

Next, with reference to FIGS. 8 and 9, description will be made of process content performed in a communication control method in the host providing system 1.

First, the communication data receiving unit 91 receives, from a certain physical instance 71, communication data having another instance as a transmission destination via the management network $N_C$ (S1). Next, the determination unit 93 refers to the physical instance information table, extracts a port ID correlated with information (an IP address and a MAC address) indicating the transmission source as a first port ID, extracts a user ID correlated with the first port ID as a first user ID, extracts a port ID correlated with the information indicating the transmission destination as a second port ID, and extracts a user ID correlated with the second port ID as a second user ID (S2).

Next, the determination unit 93 determines whether or not the first user ID matches the second user ID (S3). If it is determined that the first user ID matches the second user ID, the process procedure proceeds to step S4. On the other hand, if it is determined that the first user ID does not match the second user ID, the process procedure proceeds to step S5.

In step S4, the communication data control unit 94 permits communication of the communication data with the transmission destination (S4). On the other hand, in step S5, the communication data control unit 94 does not permit communication of the communication data with the transmission destination (S5).

Figure 8:
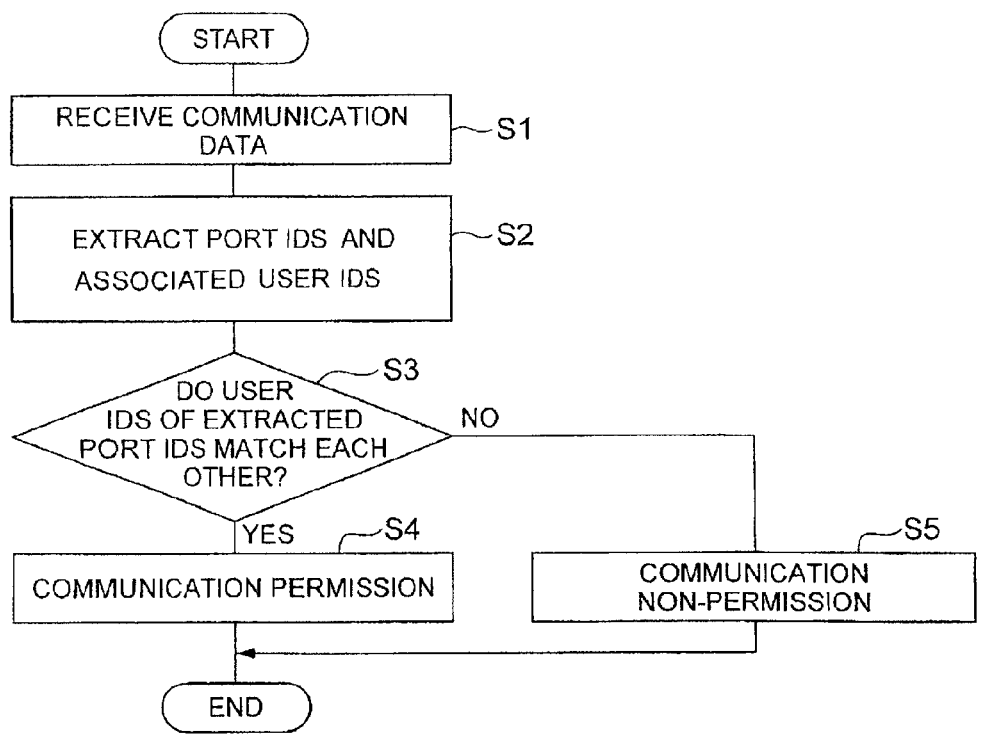
FIG. 8 is a flowchart illustrating process content of the host providing system in a communication control method.
Figure 9:
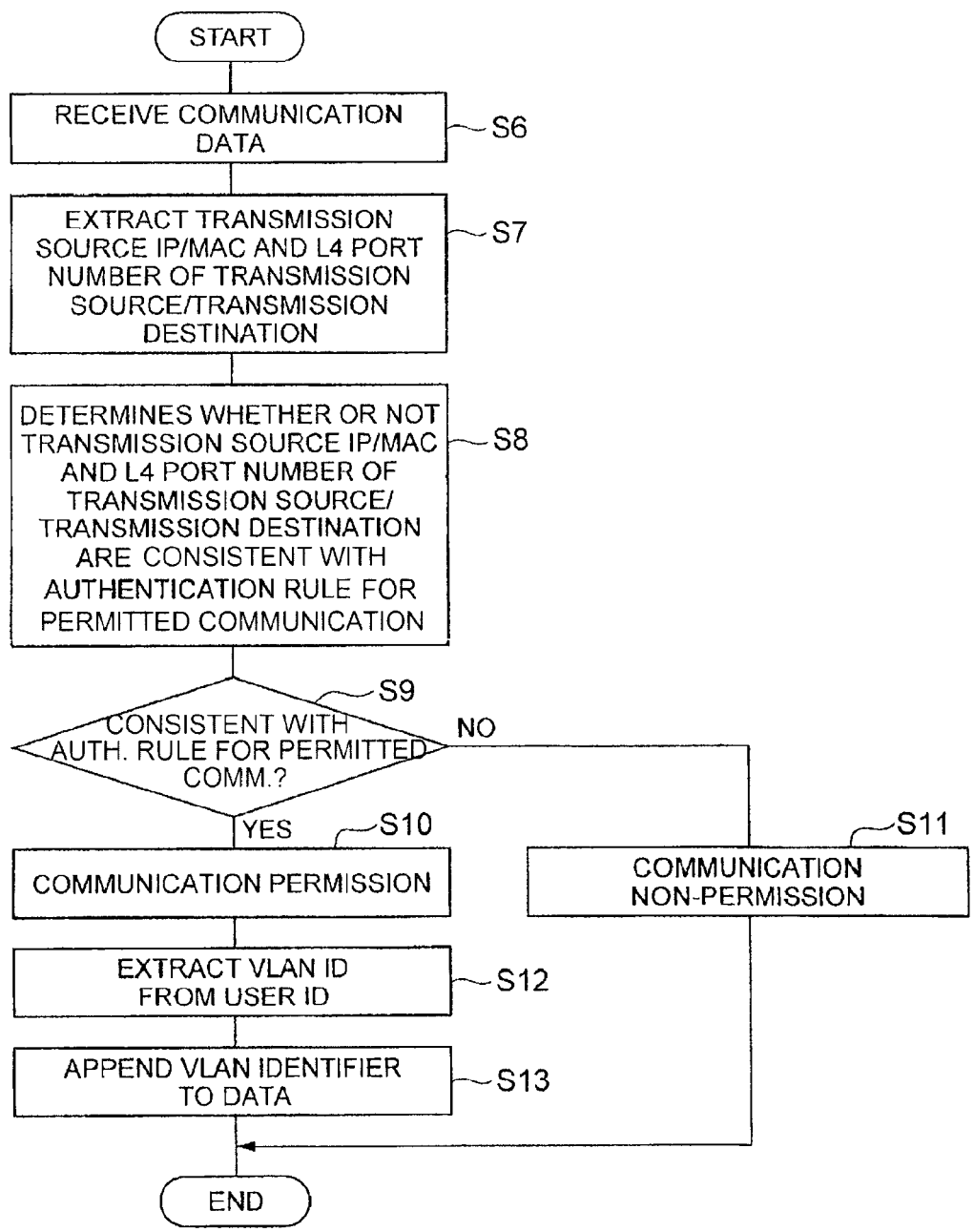
FIG. 9 is a flowchart illustrating process content of the host providing system in the communication control method.

The determination process illustrated in FIG. 8 is performed in both cases of transmission and reception of communication data in each port 9. When communication data is transmitted, permission and non-permission of communication are further determined in each port 9 through a process illustrated in FIG. 9. In other words, when data is transmitted, communication of communication data is performed in a case where communication permission is determined in both of the determination process illustrated in FIG. 8 and the determination process illustrated in FIG. 9. On the other hand, when data is received, data communication is performed in a case where communication permission is determined in the determination process illustrated in FIG. 8. Hereinafter, with reference to FIG. 9, a description will be made of determination process content when data is transmitted.

First, the communication data receiving unit 91 receives communication data from a certain physical instance 71 (S6). Next, the determination unit 93 extracts an IP address, a MAC address, an L4 port number of the transmission source, and an L4 port number of the transmission destination from the communication data (S7).

Next, the determination unit determines whether or not the IP address, the MAC address, the L4 port number of the transmission source, and the L4 port number of the transmission destination extracted in step S7 are consistent with an authentication rule for permitted communication stored in the authentication rule storage unit 92 on the basis thereof (S8). Here, if it is determined that the information is consistent with the authentication rule for permitted communication (S9), the process procedure proceeds to step S10. On the other hand, if it is determined that the information is not consistent with the authentication rule for permitted communication (S9), the process procedure proceeds to step S11. In step S10, the communication data control unit 94 permits communication of the communication data with the transmission destination. On the other hand, in step S11, the communication data control unit 94 does not permit communication with the transmission destination and performs control so that the communication data is not sent to the transmission destination (step S11).

In step S12, the communication data control unit 94 extracts a VLAN ID correlated with a user ID of the transmission source by referring to the VLAN information table (S12). In addition, the communication data control unit 94 appends the extracted VLAN ID to the communication data, and sends the communication data to the port 9 of the transmission destination (S13).

Next, with reference to FIGS. 10 to 12, a description will be made of a function of the storage access managing unit 60 which manages access to a storage of the network storage group 6.

Figure 10:
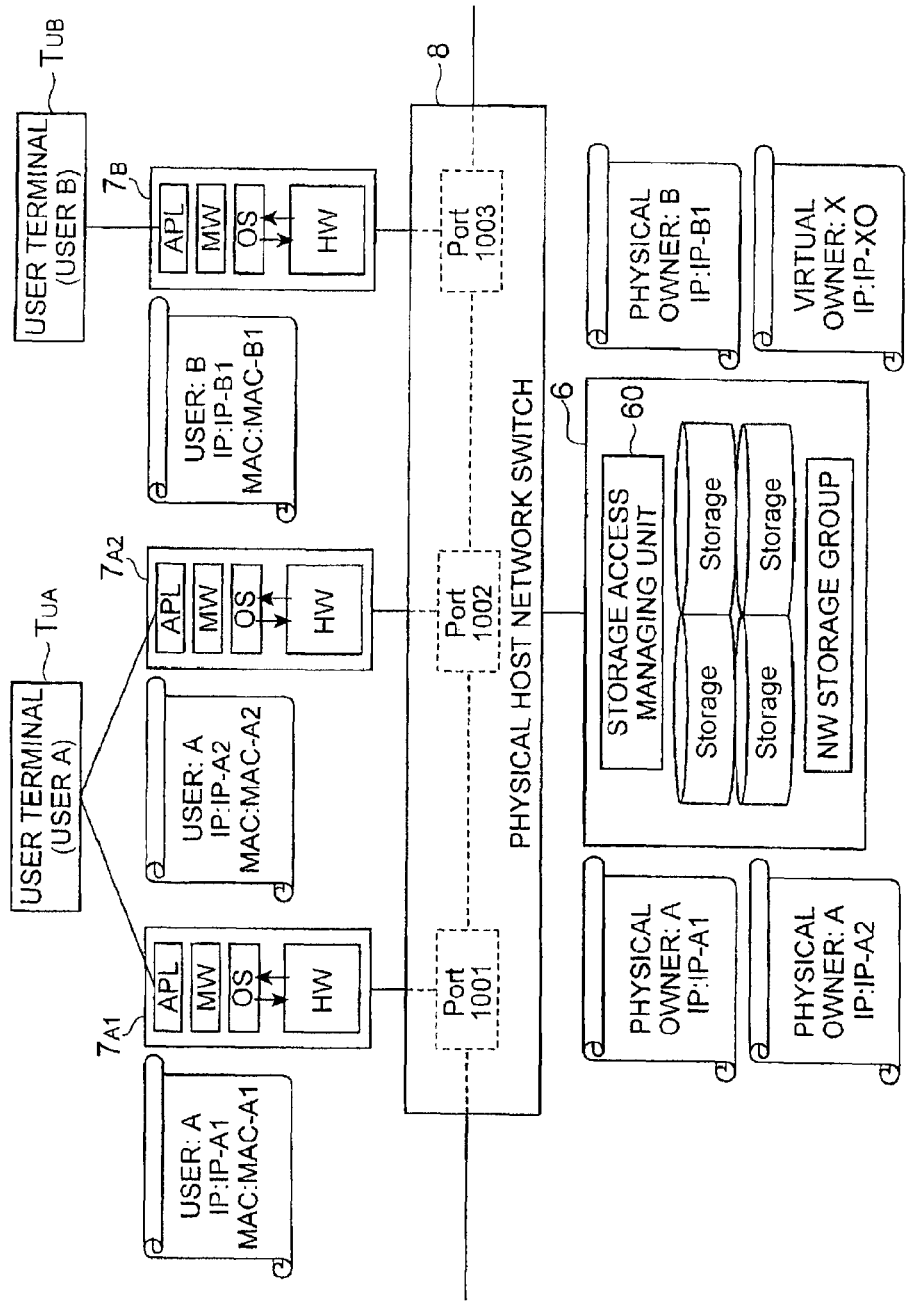
FIG. 10 is a diagram illustrating a connection relationship between a physical instance and a network storage group in the management network.

As illustrated in FIG. 10, the host providing system 1 includes the network storage group 6 which is a set of a plurality of storages which can be accessed by each instance via the management network $N_C$. The network storage group 6 includes the storage access managing unit 60 which manages access to the storage.

Figure 11:
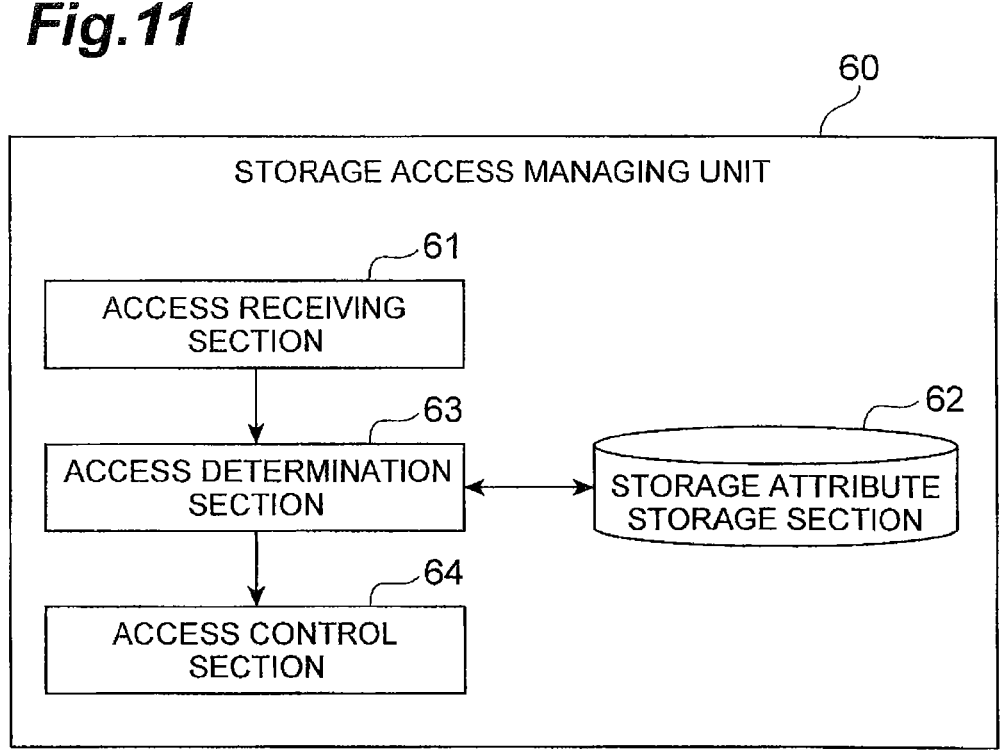
FIG. 11 is a block diagram illustrating a functional configuration of a storage access managing unit.

FIG. 11 is a block diagram illustrating a functional configuration of the storage access managing unit 60. As illustrated in FIG. 11, the storage access managing unit 60 includes an access receiving section 61 (access receiving means), a storage attribute storage section 62 (storage attribute storage means), an access determination section 63 (access determination means), and an access control section 64 (access control means).

The access receiving section 61 is a part which receives an access request to a storage from an instance. The access request includes an IP address for identifying an instance which is a transmission source of the access and a storage ID (storage identifier) for identifying a storage which is an access target.

The storage attribute storage section 62 is a part which stores an IP address of an instance to which a corresponding storage is allocated, in correlation with a storage ID. In the present embodiment, a single storage may be allocated to each instance. In other words, the number of instances which can access a single storage is not limited to one. FIG. 12 is a diagram illustrating a configuration of the storage attribute storage section 62 and an example of stored data. As illustrated in FIG. 12, the storage attribute storage section 62 stores an IP address of an instance allocated to a corresponding storage in correlation with a storage ID. In addition, the storage attribute storage section 62 may further store a user and an instance type (a physical instance or a virtual instance) of an access source in correlation with the storage ID. For example, as a storage attribute of a storage ID "$I_{A1}$", data such as an IP address "IP-A1", a user "A", and an instance type "physical" is stored. A determination process using the storage attribute information will be described later.

The access determination section 63 is a part which determines whether or not the IP address included in the access request received by the access receiving section 61 corresponds to an IP address correlated with a storage ID of a storage which is an access target in the storage attribute storage section 62.

In a case where it is determined by the access determination section 63 that the IP address included in the access request corresponds to the IP address correlated with the storage ID in the storage attribute storage section 62, the access control section 64 permits the access to the storage, and sends the access request to the storage. In addition, in a case where it is determined that the IP address included in the access request does not correspond to the IP address correlated with the storage ID in the storage attribute storage section 62, the access control section 64 does not permit access to the storage, and performs control so that the access request is not sent to the storage.

A description will be made of specific examples of a determination process in the access determination section 63 and a control process in the access control section 64.

First, a first example will be described. In the first example, an access request to the storage ID "$I_{A1}$" from the physical instance $71_{A1}$ provided to the user A is received by the storage access managing unit 60. This access request includes the MAC address "MAC-A1" and the IP address "IP-A1" of the transmission source and the storage ID "$I_{A1}$" of the storage which is an access target. When the access request is received, the access determination section 63 extracts the IP address "IP-A1" correlated with the storage ID "$I_{A1}$" in the storage attribute storage section 62. In addition, the access determination section 63 determines that the IP address "IP-A1" of the transmission source included in the access request corresponds to the IP address extracted from the storage attribute storage section 62. Therefore, the access control section 64 permits the access to the storage identified by the storage ID "$I_{A1}$", and sends data related to the access.

Next, a second example will be described. In the second example, an access request to the storage ID "$I_{A1}$" from the physical instance $71_B$ provided to the user B is received by the storage access managing unit 60. This access request includes the MAC address "MAC-B1" and the IP address "IP-B1" of the transmission source and the storage ID "$I_{A1}$" of the storage which is an access target. When the access request is received, the access determination section 63 extracts the IP address "IP-A1" correlated with the storage ID "$I_{A1}$" in the storage attribute storage section 62. In addition, the access determination section 63 determines that the IP address "IP-B1" of the transmission source included in the access request does not correspond to the IP address extracted from the storage attribute storage section 62. Therefore, the access control section 64 does not permit the access to the storage identified by the storage ID "$I_{A1}$" from the physical instance $71_B$, and performs control so that data related to the access is not sent to the storage.

Next, a third example will be described. In the third example, an access request to the storage ID "$I_{A1}$" from the physical instance $71_B$ provided to the user B is received, and the IP address "IP-A1" of the user A is spoofed as an IP address of the transmission source. In this case, the access is interrupted by the physical host network switch 9 due to being unsuitable for the authentication rule (refer to FIG. 6) regarding the transmission source IP address of the priority "10020" before reaching the storage access managing unit 60.

Figure 13:
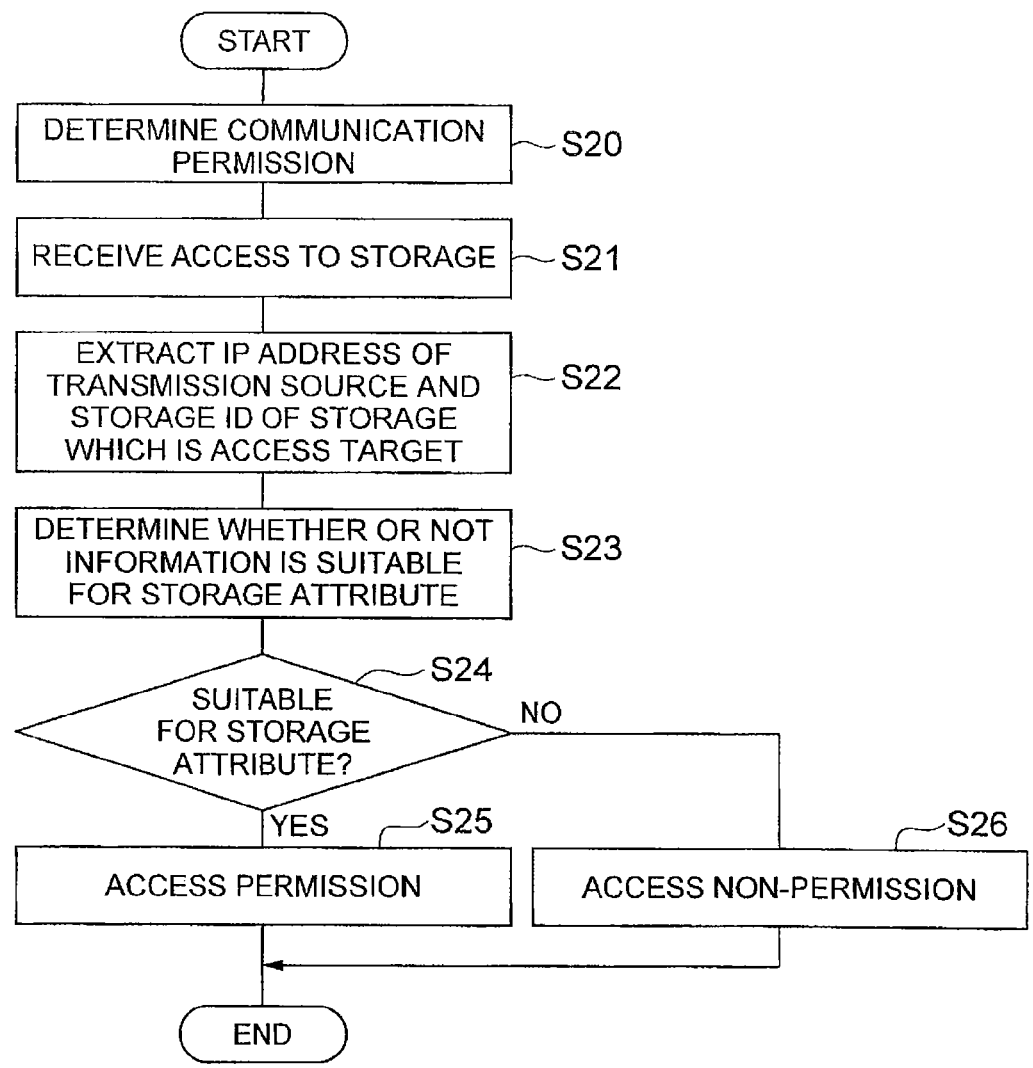
FIG. 13 is a flowchart illustrating process content performed in a control method of access to a storage in the host providing system.

Next, with reference to FIG. 13, a description will be made of process content performed in a control method of access to a storage in the host providing system 1.

A process in step S20 is the determination process described with reference to FIGS. 8 and 9. In addition, if a storage is set to communicate with all users, communication can be permitted through user authentication between the ports in FIG. 8. In subsequent step S21, the access receiving section 61 receives an access request to the storage from an instance (S21). Successively, the access determination section 63 extracts a transmission source IP address and a storage ID of the storage which is an access target from the received access request (S22). In addition, the access determination section 63 determines whether or not the IP address included in the access request received by the access receiving section 61 corresponds to an IP address correlated with the storage ID of the storage which is an access target in the storage attribute storage section 62 (S23). Here, if it is determined that the IP address included in the access request is suitable for the IP address extracted from the storage attribute storage section 62 (S24), the process procedure proceeds to step S25. On the other hand, if it is determined that the IP address is not suitable for the extracted IP address (S24), the process procedure proceeds to step S26.

In step S25, if it is determined by the access determination section 63 that the IP address included in the access request corresponds to the IP address correlated with the storage ID in the storage attribute storage section 62, the access control section 64 permits the access to the storage and sends data related to the access to the storage (S25).

On the other hand, in step S26, if it is determined by the access determination section 63 that the IP address included in the access request does not correspond to the IP address correlated with the storage ID in the storage attribute storage section 62, the access control section 64 does not permit the access to the storage and performs control so that the access is not sent to the storage (S26).

According to the host providing system 1 and the communication control method of the present embodiment, permission and non-permission of communication are determined on the basis of whether or not information pieces indicating users correlated with information indicating a transmission source and information indicating a transmission destination included in communication data from the physical instance 71 match each other, and the communication data is controlled on the basis of a determination result. Accordingly, since only communication between instances of the same user is permitted, and thus communication from a physical instance is appropriately controlled, it is possible to ensure security in the system.

In addition, access is permitted only in a case where an IP address included in an access request to a storage from the physical instance 71 corresponds to an IP address of the physical instance 71 to which the storage is allocated, and access is not permitted in other cases. Accordingly, access from instances other than the physical instance 71 to which the storage is allocated is prevented, and thus security is appropriately ensured in the storage.

As mentioned above, the present invention has been described in detail on the basis of the embodiment thereof. However, the present invention is not limited to the embodiment. The present invention may have various modifications within the scope without departing from the spirit thereof.

REFERENCE SIGNS LIST

1 Host providing system, 2 Request receiving node, 3 Host selecting node, 4 Host information collecting node, 5 Physical host managing node, 6 Network storage group, 7, $7_{A1}$, $7_{A2}$, $7_B$ First server, 8 Second server, 9 Physical host network switch, $9_{A1}$, $9_{A2}$, $9_B$ Port, 60 Storage access managing unit, 61 Access receiving section, 62 Storage attribute storage section, 63 Access determination section, 64 Access control section, 71, $71_{A1}$, $71_{A2}$, $71_B$ Physical instance, 81 Virtual host managing node, 84 Hypervisor, 85 Virtual instance, 91 Communication data receiving unit, 92 Authentication rule storage unit, 93 Determination unit, 94 Communication data control unit, $N_C$ Management network, $N_P$ Public network, $T_U$, $T_{UA}$, $T_{UB}$ User terminal.

The invention claimed is:

1. A host providing system comprising:
a plurality of physical instance servers coupled with a first network and a second network, the plurality of physical instance servers being configured to communicate with one another via the second network;
a switch; and
a controller configured to:
select one of the plurality of physical instance servers to provide a first physical instance as a host computer to a user terminal via the first network in response to a request from the user terminal; and
store, in an instance information table, first port identification information corresponding to the first physical instance in association with first user identification information corresponding to the user terminal, the first port identification information identifying a first communication port of the switch through which the first physical instance is connected to the second network;
wherein the switch is configured to:
receive communication data from the first physical instance via the first communication port, the communication data including information indicating a transmission source and indicating a second instance as a transmission destination;
identify an authentication rule stored in association with the first port identification information that identifies the first communication port of the switch;
obtain source port identification information and source user identification information based on the information included in the communication data using the instance information table;
obtain second port identification information and second user identification information based on the information included in the communication data using the instance information table, the second port identification information identifying a second communication port of the switch through which the second instance is connected to the second network;
determine permission or non-permission of communication of the communication data on the basis of whether or not the source user identification information matches the second user identification information and whether or not the communication data is consistent with the authentication rule; and
permit communication with the transmission destination and send the communication data to the transmission destination when communication permission is determined, and not permit communication with the transmission destination and not send the communication data to the transmission destination when communication permission is not determined.

2. The host providing system according to claim 1, further comprising:
one or more virtual instance servers configured to provide a virtual instance to the user terminal as a virtual host via the first network, the one or more virtual instance servers being configured to communicate with one another or with the plurality of physical instance servers via the second network; and
wherein the switch is configured to append, to the communication data, a virtual network identifier for identifying a virtual network which is virtually and uniquely allocated to a single user and is formed in the second network.

3. The host providing system according to claim 1, further comprising:
a plurality of storages respectively correlated with respective instances and accessible via the second network; and
circuitry configured to:
receive an access request which corresponds to access to a storage from a particular instance and includes an IP address for identifying the particular instance and a storage identifier for identifying the storage which is an access target;

store an IP address of an instance to which the storage is allocated in correlation with the storage identifier;

determine whether or not an IP address included in the received access request corresponds to an IP address correlated with a storage identifier of a storage which is a target of the access request; and permit the access to the storage and send the access request to the storage when it is determined that the IP address included in the access request corresponds to the IP address correlated with the storage identifier, and not permit the access to the storage and not send the access request to the storage when it is determined that the IP address included in the access request does not correspond to the IP address correlated with the storage identifier.

4. The host providing system according to claim 1, wherein the authentication rule corresponds to a protocol port number of the transmission source that corresponds to a server on a Dynamic Host Configuration Protocol (DHCP) and a protocol port number of the transmission destination that corresponds to a client on the DHCP, and wherein the switch determines that the communication data is inconsistent with the authentication rule when protocol port numbers included in the communication data match the corresponding protocol port numbers included in the authentication rule.

5. The host providing system according to claim 1, wherein the authentication rule corresponds to a protocol port number of the transmission source that corresponds to a client on a Dynamic Host Configuration Protocol (DHCP) and a protocol port number of the transmission destination that corresponds to a server on the DHCP, and wherein the switch determines that the communication data is consistent with the authentication rule when protocol port numbers included in the communication data match the corresponding protocol port numbers included in the authentication rule.

6. The host providing system according to claim 1, wherein the authentication rule corresponds to a MAC address, an IP address, or both a MAC address and an IP address of an instance connected to the first communication port receiving the communication data, and wherein the switch determines that the communication data is consistent with the authentication rule when a MAC address, an IP address, or both a MAC address and an IP address of the transmission source included in the communication data match the MAC address, the IP address, or both the MAC address and the IP address included in the authentication rule.

7. A communication control method of controlling communication between instances in a host providing system providing the instances, the method comprising:

selecting one of a plurality of physical instance servers of the host providing system to provide a first physical instance as a host computer to a user terminal via a first network in response to a request from the user terminal, the plurality of physical instance servers being coupled with the first network and a second network, the plurality of physical instance servers being configured to communicate with one another via the second network;

storing, in an instance information table, first port identification information corresponding to the first physical instance in association with first user identification information corresponding to the user terminal, the first port identification information identifying a first communication port of a switch through which the first physical instance is connected to the second network;

receiving communication data from the first physical instance via the first communication port, the communication data including information indicating a transmission source and indicating a second instance as a transmission destination;

identifying an authentication rule stored in association with the first port identification information that identifies the first communication port of the switch;

obtaining source port identification information and source user identification information based on the information included in the communication data using the instance information table;

obtaining second port identification information and second user identification information based on the information included in the communication data using the instance information table, the second port identification information identifying a second communication port of the switch through which the second instance is connected to the second network;

determining permission or non-permission of communication of the communication data on the basis of whether or not the source user identification information matches the second user identification information and whether or not the communication data is consistent with the authentication rule; and permitting communication with the transmission destination and sending the communication data to the transmission destination when communication permission is determined in the determination step, and not permitting communication with the transmission destination and not sending the communication data to the transmission destination when communication permission is not determined.

8. The communication control method according to claim 7, wherein the host providing system further includes:
a plurality of storages respectively correlated with respective instances and accessible via the second network; and
circuitry configured to store an IP address of an instance to which the storage is allocated in correlation with a storage identifier for identifying the storage, wherein the communication control method further comprises:

receiving an access request which corresponds to access to a storage from a particular instance and includes an IP address for identifying the particular instance and a storage identifier for identifying the storage which is an access target;

determining whether or not an IP address included in the access request received corresponds to an IP address correlated with a storage identifier of a storage which is a target of the access request; and permitting the access to the storage and sending the access request to the storage when it is determined in the access determination step that the IP address included in the access request corresponds to the IP address correlated with the storage identifier, and not permitting the access to the storage and not sending the access request to the storage when it is determined that the IP address included in the access request does not correspond to the IP address correlated with the storage identifier.

9. The communication control method according to claim 7,
wherein the authentication rule corresponds to a protocol port number of the transmission source that corresponds to a server on a Dynamic Host Configuration Protocol (DHCP) and a protocol port number of the transmission destination that corresponds to a client on the DHCP, and
wherein determining whether or not the communication data is consistent with the authentication rule comprises determining the communication data is inconsistent with the authentication rule when protocol port numbers included in the communication data match the corresponding protocol port numbers included in the authentication rule.

10. The communication control method according to claim 7,
wherein the authentication rule corresponds to a protocol port number of the transmission source the corresponds to a client on a Dynamic Host Configuration Protocol (DHCP) and a protocol port number of the transmission destination that corresponds to a server on the DHCP, and
wherein determining whether or not the communication data is consistent with the authentication rule comprises determining the communication data is consistent with the authentication rule when protocol port numbers included in the communication data match the corresponding protocol port numbers included in the authentication rule.

11. The communication control method according to claim 7,
wherein the authentication rule corresponds to a MAC address, an IP address, or both a MAC address and an IP address of an instance connected to the first communication port receiving the communication data, and
wherein determining whether or not the communication data is consistent with the authentication rule comprises determining the communication data is consistent with the authentication rule when a MAC address, an IP address, or both a MAC address and an IP address of the transmission source included in the communication data match the MAC address, the IP address, or both the MAC address and the IP address included in the authentication rule.

* * * * *